Aug. 3, 1965 H. R. BARTA 3,199,113

RECORDING DRUM RECORD LATCH

Filed Oct. 19, 1962 2 Sheets-Sheet 1

INVENTOR.
Henry R. Barta.
BY Charles F. Steininger
ATTORNEY.

Aug. 3, 1965 H. R. BARTA 3,199,113

RECORDING DRUM RECORD LATCH

Filed Oct. 19, 1962 2 Sheets-Sheet 2

INVENTOR.
Henry R. Barta.

BY Charles F. Steininger
ATTORNEY.

United States Patent Office 3,199,113
Patented Aug. 3, 1965

3,199,113
RECORDING DRUM RECORD LATCH

Henry R. Barta, Dallas, Tex., assignor to The Atlantic Refining Company, Philadelphia, Pa., a corporation of Pennsylvania Filed Oct. 19, 1962, Ser. No. 231,786
6 Claims. (Cl. 346—138)

This invention relates to an improved record latch and more particularly to a record latch for maintaining a flexible record sheet around a seismic recording drum.

Presently used record latches utilize combinations of various elements to secure the records to the recording drums. In most cases these elements are made an integral part of the recording drum or are fixed in the drum so that a major disassembly job is required to replace or repair the latch. This repair-replacement difficulty together with loading-unloading difficulties, also common to most latches, are objectionable features regardless of where the record latch is used. However, these features are particularly objectionable when the latch is used on a portable seismic recording drum that operates in remote areas where skilled mechanics are not available and the drum must be loaded and unloaded frequently with minimum time delay.

Accordingly, an object of the present invention is to provide an improved, simplified latch for maintaining a flexible record sheet around a record drum.

Another object of the present invention is to provide a record latch that is easy to repair or replace in the field.

Another object of the present invention is to provide a record latch that is economical to manufacture and easy to maintain.

Another object of the present invention is to provide a record latch that allows lateral displacement with respect to the drum and provides a simplified means for varying the bias on the latch.

Another object of the present invention is to provide a recording drum latch that simplifies loading and unloading the record sheet.

These and other objects and advantages of the present invention will become more apparent from the detailed description of the invention together with its drawings.

Briefly described, the invention comprises a base means, a first holding member adapted to retain one end of a sheet record, a second holding member adapted to retain a second end of the sheet record, a means for sliding the second holding member toward and away from the first holding member, and a means for biasing the slide means in the direction toward the first holding member.

Figure 1B:
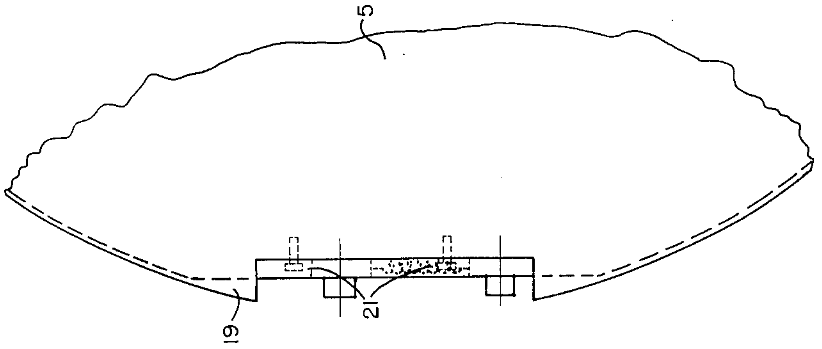
FIGURE 1B is a side view of FIGURE 1A.
Figure 1A:
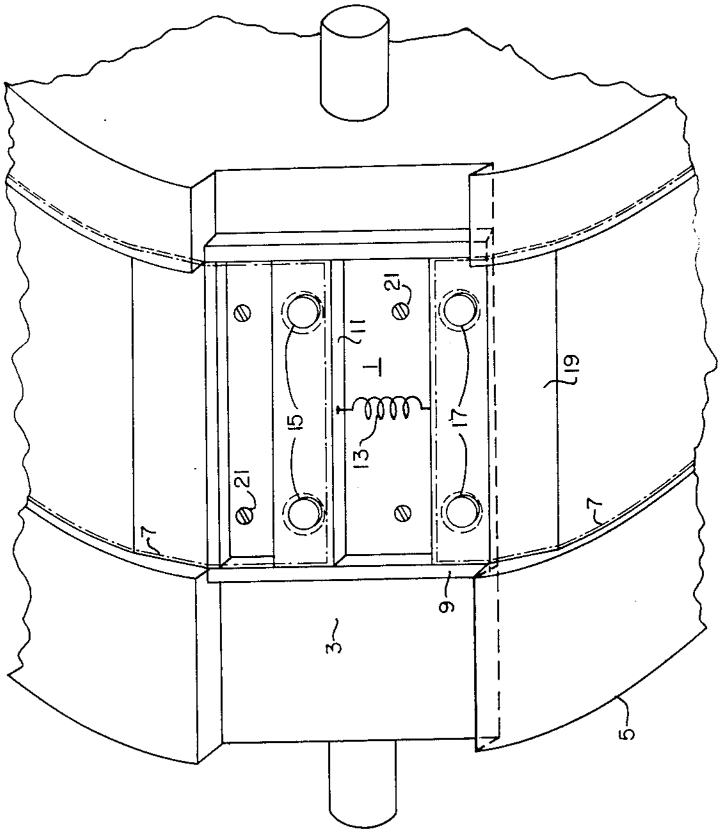
FIGURE 1A is an isometric drawing of the invention as it may be used to hold a flexible record on a recording drum.

FIGURE 1A shows improved record latch 1 positioned in notch 3 of recording drum 5. The flexible record 7 is represented by chained dashed lines so the details of latch 1 are not obscured. The major components of latch 1 include base means 9, slide means 11, bias means 13, and holding members 15 and 17, each of which is adapted to retain one end of flexible record 7. Slide 11 is shown located within the confines of base 9 and is connected to holding member 15. Base 9 is connected to holding member 17 and is arranged to allow slide 11 to move over at least a portion of its structure. Biasing means 13 is connected between slide 11 and base 9 and serves to hold slide 11 in a position so record 7 is securely fitted around the circumference of drum 5. Notch 3 in the surface of drum 5 allows the latch to be recessed below the surface of the drum. The edges of the notch adjacent the latch are beveled to form inclines 19. The inclines allow transducers, not shown, operating on record sheet 7 to pass over the latch without contacting the edges of the notch. If the inclines are not used, some type of transducer raising and lowering means should be used to prevent the transducers from striking the edges as the drum rotates. Screws 21 secure the slide to the drum and are countersunk in base 9 to allow latch 11 freedom of movement. If desired, the diameter of the screws may be undersized so that the exact position of the latch can be adjusted before the screws are secured. The particular type of holding members 15 and 17 as well as the number of elements making up each holding member can be varied as desired. That is, various types of well-known clamps, pins, or other types of fasteners can be used to make up members 15 and 17. If projecting pins such as shown in FIGURE 1A are used as elements in each holding member, the number of pins used per member will, to a certain extent, depend upon the width of record 7 and the forces to which the record is subjected. The manner in which slide 11 is adapted to fit and move within base 9 can vary as will be evident to those skilled in the art. The strength and type of biasing means 13 as well as the manner in which it is connected can also vary as will be detailed hereinafter. If a number of flexible records are mounted on the same drum a plurality of latches or a single latch mounting the appropriate number of holding members can be used.

Regardless of the type of particular components used, when it is desirable to load or unload latch 1, slide 11 is moved away from holding member 17 so that one or both ends of record 7 can be removed from their respective holding members.

FIGURE 1B is a side view of the drum and latch shown in FIGURE 1A and is used to further illustrate how latch 1 may be attached to or removed from the drum.

Figure 2B:
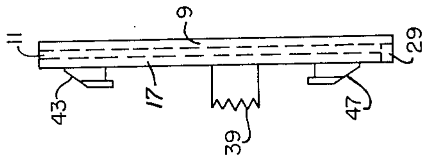
FIGURE 2B is a side view of FIGURE 2A.
Figure 2A:
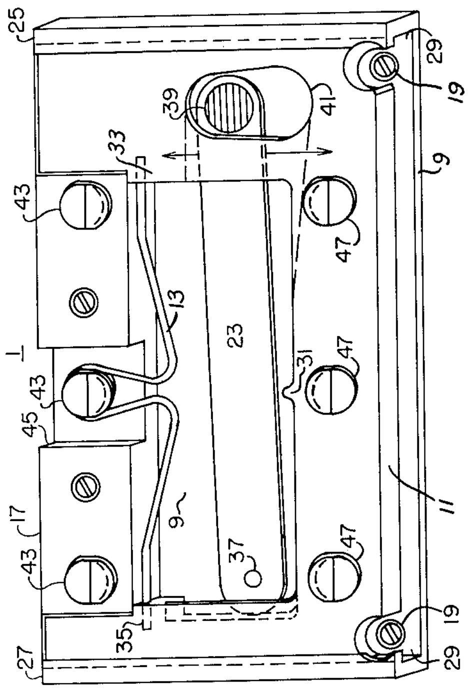
FIGURE 2A illustrates one embodiment of the invention.

FIGURE 2A illustrates one embodiment of the invention in detail. Components in this figure corresponding to generic components in FIGURE 1A are identified by similar numbers. Latch 1, FIGURE 2A, is designed to secure a magnetic tape approximately two inches wide around a twelve inch diameter recording drum. The illustrated latch measures approximately 1.4 by 2.5 by 0.31 inches. Base 9 and slide 11 are made of bearing bronze while control arm 23 is made of stainless steel.

Examining the latch in more detail, it can be seen that base 9 includes shoulders or guide means 25 and 27, each having a gib 29 cut in its interior side. Slide 11 is a generally U-shaped structure having two edges notched to fit into gibs 29 as shown. The notch-gib arrangement prevents the separation of slide 11 and base 9 yet allows 11 to slide with a minimum of friction. Slide 11 also includes projection 31 and shoulders 33 and 35. Spring 13 is secured to slide 11 as shown. Control arm 23 is attached to base 9 by pivot pin 37. Handle 39 is connected to arm 23 and projects through aperture 41 in slide 11. Record holding member 17 is an integral part of base 9 and includes projecting pins 43. Notch 45 around center pin 43 of holding member 17 allows a portion of spring 13 to fit over center pin 43 as shown. This snap-on arrangement allows spring 13 to be replaced with a minimum of effort. Record holding member 15, FIGURE 1A, is an integral part of slide 11 and is shown in FIGURE 2A as pins 47. Screws 19 are countersunk in base 9 to allow slide 11 freedom of movement over base 9.

To load a tape or paper record 7 on latch 1, precut holes in one end of the record, not shown, are placed over pins 43. The operator then places a finger on handle 39 causing control arm 23 to apply pressure to projection 31 moving slide 11 approximately 0.125 inch away from holding pins 43. The other end of the record, which has been moved around the circumference of the drum, is positioned so that its precut holes fit over pins 47. Handle 39 is then released allowing spring 13 to move slide 11 back toward pins 43 until shoulders 33 and 35 rest on member 17 as shown.

FIGURE 2B is a side view of latch 1, FIGURE 2A. Note that a portion of the top surfaces of pins 43 and 47 are inclined to facilitate the placing of the record over the pins.

Although a specific embodiment of the invention including size, materials, and configurations have been described, it is to be understood that this is done for the purpose of illustration only, that the invention is not to be limited to the specific disclosures but may be modified and embodied in various other forms without departing from its spirit, and that the invention includes all modifications and embodiments coming within the scope of the appended claims.

I claim:

1. A thin, single-unit record latch adapted to fit in a shallow notch on the periphery of a record drum and to maintain a flexible sheet record around said record drum in a manner such that said sheet record substantially encircles the circumference of said record drum, comprising, (a) a base member having a first holding means formed on one end for connecting to an end of said sheet record and guide elements formed on each side, (b) a slide member having a second holding means formed thereon for connecting to the other end of said sheet movably mounted between said guide elements of said base member, (c) a spring mechanism for biasing said slide member in a direction such that said second holding means tends to move toward said first holding means.

2. In a device as set forth in claim 1, wherein the lengthwise dimension of the record latch is less than its lateral dimension.

3. In a device as set forth in claim 2, wherein the slide member is generally U-shaped and the spring mechanism fits between the arms of said slide member.

4. In a device as set forth in claim 3, wherein a control arm adapted to move the slide member in the direction opposing the spring mechanism is pivotally mounted on the base member between the arms of said slide member.

5. In a device as set forth in claim 4, wherein the spring mechanism is of the flat wire type and attaches to the slide member and the base member.

6. In a device as set forth in claim 5, wherein each of the first and second holding means includes a plurality of projecting pins having top portions inclining downward and outward.

References Cited by the Examiner

UNITED STATES PATENTS

| | | | |
|---|---|---|---|
| 1,545,659 | 7/25 | Ives | 346—138 |
| 2,296,533 | 9/42 | Neal | 101—415.1 |
| 2,512,940 | 6/50 | Janke | 101—415.1 |
| 2,820,409 | 1/58 | Johnson | 101—415.1 |
| 3,110,255 | 11/63 | Jeschke et al. | 101—415.1 |

LEO SMILOW, *Primary Examiner.*

UNITED STATES PATENT OFFICE
CERTIFICATE OF CORRECTION

Patent No. 3,199,113 August 3, 1965

Henry R. Barta

It is hereby certified that error appears in the above numbered patent requiring correction and that the said Letters Patent should read as corrected below.

Column 2, line 9, for "slide" read -- latch --; same column 2, line 10, for "latch" read -- slide --.

Signed and sealed this 8th day of February 1966.

(SEAL)
Attest:

ERNEST W. SWIDER
Attesting Officer

EDWARD J. BRENNER
Commissioner of Patents